March 31, 1970 SHOJI OKAWA ET AL 3,504,309

MECHANICAL FILTER

Filed April 18, 1967 3 Sheets-Sheet 1

INVENTOR
SHOJI OKAWA
KEIICHI YOSHIZAKI
BY McGlew and Toren
ATTORNEYS

MECHANICAL FILTER

Filed April 18, 1967 3 Sheets-Sheet 2

INVENTOR
SHOJI OKAWA
KEIICHI YOSHIZAKI
BY McGlew and Toren
ATTORNEYS

MECHANICAL FILTER
Filed April 18, 1967 
Fig. 10
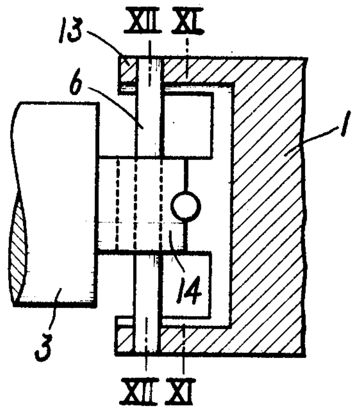
Fig. 11
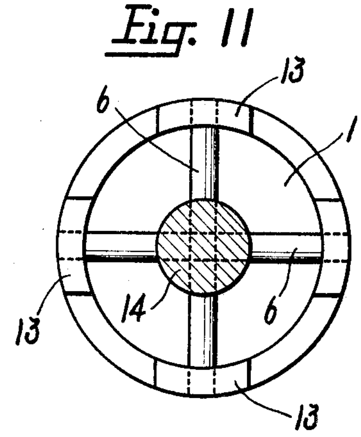
Fig. 13, Fig. 14
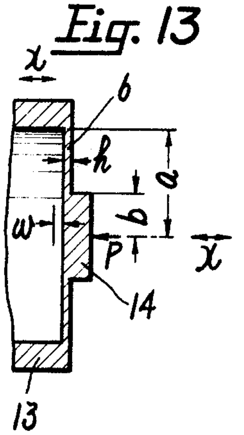
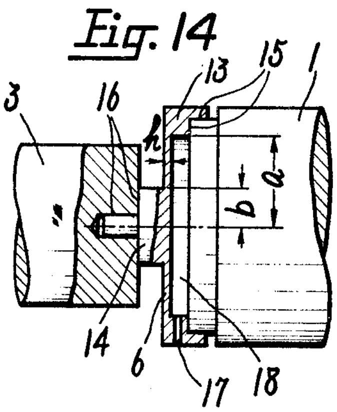
Fig. 15
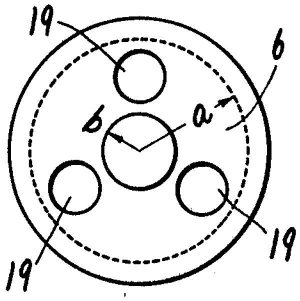
Fig. 16
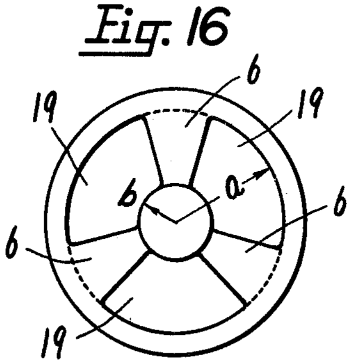
INVENTOR
SHOJI OKAWA
KEIICHI YOSHIZAKI
BY Mukglow and Toren
ATTORNEYS

3,504,309
MECHANICAL FILTER

Shoji Okawa and Keiichi Yoshizaki, Tokyo, Japan, assignors to Oki Electric Industry Company Limited, Tokyo, Japan

Filed Apr. 18, 1967, Ser. No. 631,684
Claims priority, application Japan, Apr. 28, 1966, 41/26,613, 41/26,614
Int. Cl. H03h *9/26*
U.S. Cl. 333—72 10 Claims

ABSTRACT OF THE DISCLOSURE

A neck-type mechanical band filter including plural resonator elements mechanically connected in end-to-end relation to each other and to terminating transducer elements including radially extending flexible coupling members mechanically interconnecting the ends of adjacent elements of the filter. Each coupling member includes a relatively small diameter central portion rigid with the end of one adjacent element and a relatively large diameter peripheral portion rigid with the end of the other adjacent element. Radially extending flexible coupling means interconnect the central and annular portions. In one embodiment, these radially extending coupling means comprise wires and, in another embodiment, they comprise thin flexible disks which may be apertured.

This invention relates to mechanical filters.

As already known, in a neck type longitudinal vibration and torsional vibration mechanical filter, if a characteristic that its pass-bandwidth should be very narrow is required, the diameter of the coupling element will have to be made so small as to be impossible to realize.

The present invention is characterized by a coupling element utilizing the bending vibration of an annular disk or the bending vibration of wires so as to obviate the abovemetioned disadvantage.

An object of the present invention is to provide a mechanical filter of a very narrow bandwidth.

A further object of the present invention is to provide a mechanical filter which can be applied also as a mechanical filter for a wide bandwidth.

The mechanical filter according to the present invention is characterized by coupling elements utilizing the bending vibrations of wires.

In the accompanying drawings,

FIG. 10 is a sectional view showing another embodiment of the present invention.

FIG. 11 is a front view of FIG. 10.

FIG. 13 is a sectional view for explaining the operation of the mechanical filter shown in FIG. 12.

FIG. 14 is a sectional view showing an embodiment of the mechanical filter shown in FIG. 12.

FIG. 15 is a sectional view showing another embodiment of the mechanical filter shown in FIG. 12.

FIG. 16 is a sectional view showing still another embodiment of the mechanical filter shown in FIG. 12.

The present invention shall be detailed with reference to the accompanying drawings.

Figure 1:
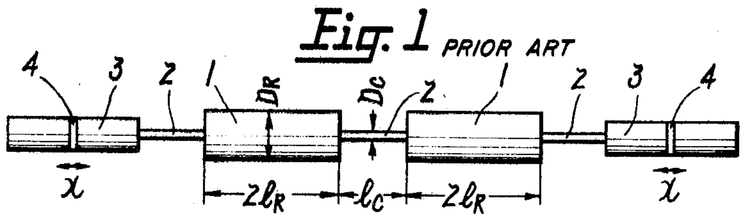
Fig. 1 PRIOR ART
FIG. 1 is a view showing an example of a known neck type longitudinal vibration mechanical filter.

FIG. 1 shows an embodiment of a known neck-type longitudinal vibration and torsional vibration mechanical filter, in which 1 denotes a $\gamma 2$-resonator, 2 denotes a $\gamma 4$-coupling element and 4 denotes an electromechanical transducer which is a so-called Lanngevin type transducer holding such piezoelectric material 4 as piezoelectric ceramic plate. As known, a specific pass-bandwidth B of such prior mechanical filter can be expressed by $$B=\frac{4}{\pi}\left(\frac{DC}{DR}\right)^2$$

wherein DR is the diameter of the $\gamma 2$-resonator and DC is the diameter of the $\gamma 4$-coupling element. Therefore, the mechanical filter, wherein the center frequency is 100 k.c. and the bandwidth is 100c./s., that is, $B=1/1000$, must be designed to be $$D_C=\sqrt{\frac{\pi}{4}B} \quad D_R \doteqdot \frac{1}{28} D_R$$

Accordingly, if $D_R=8$ mm., $D_C$ will be 0.286 mm. and will be so fine as to be difficult to make. With such a structure it is impossible to realize a mechanical filter of a smaller specific bandwidth.

Figure 2:
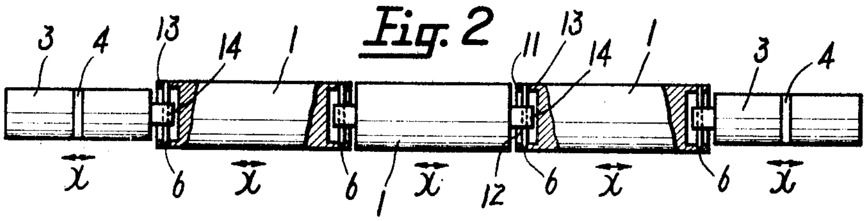
FIG. 2 is a view showing an embodiment of a mechanical filter according to the present invention.

The present invention is designed to overcome the above disadvantage. FIG. 2 shows an embodiment of a mechancial filter having coupling elements utilizing bending vibrations of wires in accordance with the present invention. In the drawing, 1 is a $\lambda/2$-resonator and 3 is an electromechanical transducer which is a so-called Lanngevin type transducer using piezoelectric element represented at 4 as a piezoelectric ceramic plate. 6 is a coupling wire utilizing bending vibrations according to the present invention. As shown also in the detailed views of FIGS. 4 and 5, said coupling extends radially between the relatively large diameter peripheral portion 13 of resonator 1 and the relatively small diameter central portion or projecting core 14 rigid or integral with and adjacent resonator 1 or a transducer 3. Wire 6 is firmly secured at 11 and 12 in a suitable manner, such as by brazing or soldering or by the use of an araldite series binder. Thus, coupling element 6 is a wire of a length Lc and clamped at both ends.

Figure 3:
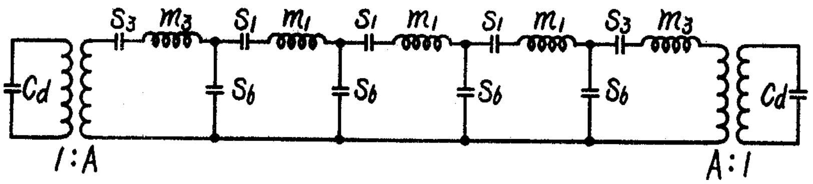
FIG. 3 is an electrically equivalent circuit diagram of the mechanical filter shown in FIG. 2.
Figure 4:
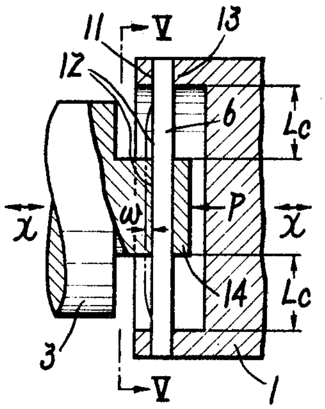
FIG. 4 is a cross-sectional view for explaining the operation of the mechanical filter according to the present invention.
Figure 5:
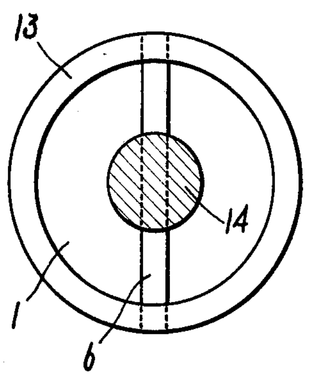
FIG. 5 is a sectional view on line VIII—VIII in FIG. 4.
Figure 6:
FIG. 6 is a sectional view of a circular coupling element.
Figure 7:
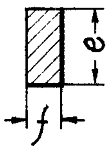
FIG. 7 is a sectional view of a rectangular coupling element.

Now, in FIG. 2, if longitudinal vibrations in the directions indicated by arrows $x$ are propagated by the transducers 3, bending vibrations will be induced in coupling elements 6, shown in FIG. 4. Thus, parts 13 and 14, rigid with adjacent resonators 1 or with an adjacent resonator 1 and a transducer 3 will vibrate freely in the directions indicated by the arrows $x$ will be propagated. In FIG. 4, in case parts 13 and 14 are perfectly fixed, if the lowest resonance frequency when only the coupling element 6 makes bending vibrations, is substantially higher than the center frequency of the mechanical filter shown in FIG. 2, the role performed by the coupling element 6, with the arrangement of FIG. 2, will be substantially a stiffness effect. Therefore, the electric equivalent circuit of the mechanical filter shown in FIG. 2 will be as represented in FIG. 3.

In FIG. 3, $S_1$ and $m_1$: equivalent stiffness and equivalent mass of resonators 1, respectively;

$S_3$ and $m_3$: equivalent stiffness and equivalent mass of electromechanical transducers 3, respectively;
$S_6$: equivalent stiffness of coupling elements 6;
A: power factor of electromechanical transducers 3; and
$C_d$: electrical capacity of electromechanical transducers 3.

The fractional bandwidth $B^1$ of the filter shown in FIG. 3 is represented by the following known formula as $B^1 \ll 1$:

$$B^1 = 2\frac{S_6}{S_1}$$

Figure 9:
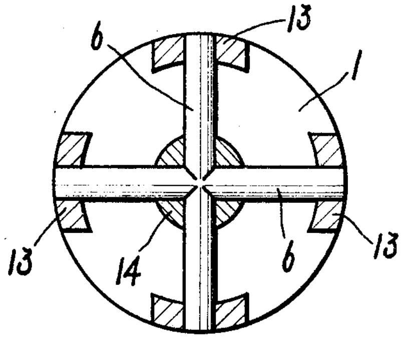
FIG. 9 is a sectional view on line XII—XII in FIG. 8.

From the relation with the displacement $\omega$ of part 14 when part 13 is fixed and an external force P is applied to part 14 in FIG. 4, $S_6$ per coupling element 6 will be represented by the following formula:

$$S_6^{(1)} = \frac{P}{\omega} = \frac{24EI}{L_C^3}$$

wherein:

E: Young's modulus of the material of the coupling element 6 and
I: Moment of inertia of the cross-section of the coupling element 6, which will be $$I = \frac{\pi}{64} d_c^4$$

in case the cross-section is circular with a diameter $d_c$ as shown in FIG. 9 and will be $I = ef^3/12$, in case the cross-section is rectangular with a width $e$ and a thickness $f$ as shown in FIG. 10.

Now, in case the cross-section of the coupling element 6 is circular as shown in FIG. 9, $$S_6^{(1)} = \frac{3\pi E d_c^4}{8L_C^3}$$

In case there are two coupling elements 6 (two upper and lower ones in the drawing) as in FIG. 4, $$S_6^{(2)} = \frac{3\pi E d_c^4}{4L_C^3}$$

When a narrow band filter of a center frequency of 100 kc. and $B^1 = 1/1000$ is analyzed according to the above described embodiment, if the above mentioned $$Fe = Ni = Cr$$

alloy is used for the material of both resonator and coupling element, when the effective length of the resonator 1 is $2l_R = 24$ mm. and $D_R = 8$ mm., if $\rho_R = 8.05$ g./cm.³, then $$m_1 = \frac{1}{2}\frac{\pi}{4} D_R^2 2l_R \rho_R = 4.85 \text{ gr.}$$

$$S_1 = m_1 \omega_0^2 = 1.91 \times 10^{12} \text{ dynes/cm.}$$

wherein $\omega_0$ is a center angular frequency and is $2\pi \times 10^5$ in this case.

Therefore, $$S_6^{(2)} = \frac{S_1}{2} B^1 = 9.25 \times 10^8 \text{ dyne/cm.}$$

In FIG. 4, if $L_C = 2.2$ mm., when $E = 1.9 \times 10^2$ dynes/cm.², $$d_c = 0.384 \text{ mm.}$$

If longitudinal vibrations in the lengthwise directions, as in FIG. 1, are not to be used but bending vibrations of a wire of a span length of 2.2 mm. clamped at both ends are to be utilized, in case the parts 13 and 14 are perfectly fixed, in FIG. 4, the lowest resonance frequency of coupling element 6 only can be calculated to be about 680 kc. and there is no danger of the appearance of an unwanted spurious frequency.

Figure 8:
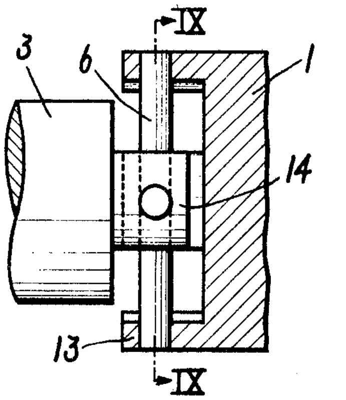
FIG. 8 is a sectional view showing another embodiment of the present invention.

FIGS. 8 and 10 are partial longitudinal sectional views, and FIGS. 9 and 11 are transverse sectional views, illustrating embodiments of a mechanical filter including coupling elements utilizing bending vibrations, in accordance with the invention, and showing the cases of using three or more couplings. That is to say, FIGS. 8 and 9 show the case wherein four coupling elements are arranged in the same cross-sectional plane XII—XII and FIGS. 10 and 11 show the case wherein they are arranged in different cross-sectional planes XIV—XIV and XV—XV. In each of the illustrated embodiments, not all the end outer periphery of the resonator 1 is projected but only a necessary part thereof.

Another embodiment of the present invention shall now be explained with reference to FIG. 12. In this embodiment, 1 is a λ/2-resonator, 6′ is an annular disk coupling element and 3 is an electromechanical transducer, which is a so-called Lanngevin type transducer using a piezoelectric element represented at 4 a piezoelectric ceramic plate, exactly the same as in the above mentioned embodiments. Thus the coupling element 6′ consists of an annular disk firmly secured at parts 15 and 16 to the resonator 1 and transducer 3, respectively, by brazing or soldering, or with an araldite series binder. Therefore, as shown in detail in FIG. 13, the coupling element is an annular disk clamped at its inner and outer peripheries, and having an outer radius $a$ and an inner radius $b$.

Figure 12:
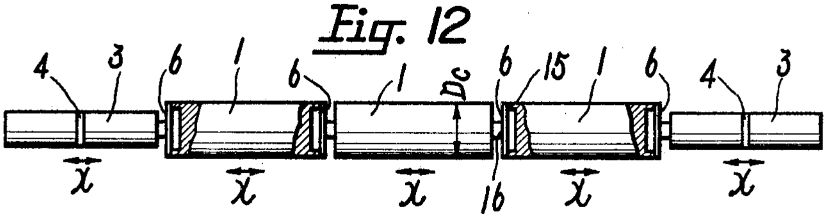
FIG. 12 is a view showing another embodiment of the mechanical filter according to the present invention.

Now, in FIG. 12, if longitudinal vibration in the directions indicated by the arrows $x$ are induced in the transducer 3, longitudinal vibrations in the direction indicated by the arrows $x$ will propagate also in the resonator 1 and, in the coupling element 6′, there will propagate bending vibrations in which the inner and outer peripheries of the coupling element 6′, clamped at its inner and outer peripheries as shown in FIG. 13 can vibrate freely in the directions indicated by the arrows $x$. In FIG. 13, in case the inner and outer peripheries 14 and 13 are firmly fixed, if the lowest resonance frequency, when only the coupling elements 6′ makes bending vibrations, is substantially higher than the center frequency of the mechanical filter shown in FIG. 13, the role performed by the coupling element 6′ with such formation as in FIG. 13 will be substantially a stiffness effect. Therefore, the electric equivalent circuit of the mechanical filter shown in FIG. 13 will be the same as is shown in FIG. 3. It has already been explained that $$B^1 = 2\frac{S_6}{S_1}$$

in FIG. 3, From the relation with the displacement $\omega$ of part 14 when part 13 is fixed and an external force P is applied to part 14 in FIG. 13, $S_6$ will be determined by the following formula:

$$S_6 = \frac{P}{\omega} = \frac{1}{K}\frac{Eh^3}{a^2}$$

wherein:

E: Young's modulus of the material of the coupling element 6,
$h$: Thickness of the coupling element 6 and
K: Constant to be determined by $a/b$ as in the following table:

| $a/b$ | $k$ |
|---|---|
| 1.25 | 0.00129 |
| 1.5 | 0.0064 |
| 2 | 0.0237 |
| 3 | 0.062 |
| 4 | 0.092 |
| 5 | 0.114 |

When a narrow band filter of a center frequency of 100 kc. and $B^1 = 1/000$ according to the above described embodiment is analyzed if the above-mentioned Fe=Ni=Cr alloy is used for the material of both the resonator element and the coupling element, when the effective length of the resonator 1 is $2lR=24$ mm. and $D_R=8$ mm., if $\rho_R=8.05$ g./cm.$^3$, then $$m_1=\frac{1}{2}\frac{\pi}{4}D_R{}^2 2l_R\rho_R=4.85 \text{ g.}$$

$$S_1=m_1\omega_C{}^2=1.91\times10^{12} \text{ dynes/cm.}$$

wherein $\omega_0$ is a center angular frequency and is $2\pi\times10^5$ in this case.

Therefore, $$S_6=\frac{S_1}{2}B^1=9.25\times10^8 \text{ dynes/cm.}$$

In FIG. 13, is $a=3.5$ mm., $b=0.7$ mm. and $a/b=5$, that is $k=0.114$ and the thickness $h$ of the coupling element 6 is calculated, when $$E=1.9\times10^{12} \text{ dynes/cm.}^2.$$

$$h=0.171 \text{ mm.}$$

A plate of such thickness is sufficiently easy to make in modern manufacturing techniques today as to be practicable. Further, in case the parts 13 and 14 are firmly fixed, in FIG. 13, the lowest resonance frequency of only the coupling element 6 can be calculated to be at least more than 400 kc. and therefore there will be no danger of the appearance of an unwanted spurious frequency.

FIG. 14 shows an embodiment in which the outer peripheral part 13 and inner peripheral part 14 are made integrally so that the clamping condition of the disk at the inner and outer peripheries may be perfect. For the joint with the resonator 1 or transducer 3, such means as soldering or bonding may be used at the parts 15 and 16. The small hole 17 in the side of the part 13 in FIG. 14 is to prevent a useless pressure from being applied to the coupling element 6 when air in an air chamber 18, formed between the coupling element 6 and the resonator 1, expands and contracts with the rise and fall of atmospheric temperature.

FIGS. 15 and 16 are elevation views showing other embodiments of the annular disk coupling element of the present invention. In case the fractional bandwidth is required to be smaller than is shown in the above described embodiments, apertures 19 of a circular, rectanglar or any other shape, as shown in FIGS. 15 and 16 may be used to provide means effective to reduce the equivalent stiffness of the coupling element 6.

The above explanation has related mostly to the case in which the fractional bandwidth is small. However, the equivalent stiffness of the coupling element will be proportional to the fourth power of the diameter in case, for example, a circular cross section wire is used, for a rectangular cross section wire will depend on the length $Lc$ and the number of the elements, will be proportional to the third power of the thickness in the case of an annular disk or, in case the disk is apertured will depend on the ratio $a/b$ of the outer radius $a$ to the inner radius $b$ and can be set in any wide range. Therefore, the coupling element can be effectively utilized for a fractional bandwidth of about 1/100 which has been conventionally practiced. Thus an effective means can be provided.

Though the case in which the vibrations in the resonator are longitudinal vibrations has been explained, the coupling element can be utilized also for a torsional vibration type.

Furthermore, although the invention has been described as using a Lanngevin type transducer as the electromechanical transducer to induce vibrations, as evident from the above described explanation, it is needless to say that the present invention can be equally well applied to a mechanical filter utilizing a magnetostriction operated system.

What is claimed is:

1. In neck-type mechanical band pass filters including plural resonator elements mechanically connected in end-to-end relation to each other and to terminating transducer elements, the improvement comprising radially extending flexible coupling members mechanically interconnecting the ends of adjacent elements of said filter; each coupling member including a relatively small diameter central portion rigid with the end of one adjacent element, a relatively large diameter peripheral portion rigid with the end of the other adjacent element and spaced radially from said central portion, and radially extending flexible coupling means interconnecting said central and annular portions.

2. In a neck-type mechanical band pass filter, the improvement claimed in claim 1, in which said flexible coupling means are wires.

3. In a neck-type mechanical band pass filter, the improvement claimed in claim 2, in which said wires have have a circular cross section.

4. In a neck-type mechanical band pass filter, the improvement claimed in claim 2, in which said wires have a rectangular cross section.

5. In a neck-type mechanical band pass filter, the improvement claimed in claim 1, in which said relatively small diameter central portion comprises a central hub projecting from an end of said one adjacent element, and said relatively large diameter peripheral portion comprises diametrically opposite cylindrical peripheral wall portions of said other adjacent element extending axially beyond an end thereof; said radially extending coupling means comprising at least one wire extending diametrically through said cylindrical wall portions and said central hub.

6. In a neck-type mechanical band pass filter, the improvement claimed in claim 5, in which said flexible coupling means comprises a pair of wires extending diametrically at right angles to each other.

7. In a neck-type mechanical band pass filter, the improvement claimed in claim 6, in which said wires are in axially spaced diametric planes.

8. In a neck-type mechanical band pass filter, the improvement claimed in claim 1, in which said radially extending flexible coupling means comprises thin-walled flexible disks.

9. In a neck-type mechanical band pass filter, the improvement claimed in claim 8, in which each of said disks includes a hub constituting said relatively small diameter central portion, and a rim constituting said relatively large diameter peripheral portion.

10. In a neck-type mechanical band pass filter, the improvement claimed in claim 8, in which said disks are apertured.

References Cited

UNITED STATES PATENTS

| | | | |
|---|---|---|---|
| 198,508 | 12/1877 | Dowling | 287—129 X |
| 2,161,956 | 6/1939 | Robertson | 287—129 |
| 2,494,574 | 1/1950 | Murphy | 287—129 |
| 2,516,472 | 7/1950 | MacKeage | 287—130 X |
| 2,800,633 | 7/1957 | Roberts et al. | 333—71 |

T. J. VEZEAU, Primary Examiner